3,155,672
N,N-DIPHENYLISONICOTINAMIDE
Claudio Pasini, Monza, Milan, and Paolo Mantegazzini, Milan, Italy, assignors to Società Farmaceutici Italia, Milan, Italy, a corporation of Italy
No Drawing. Filed May 2, 1961, Ser. No. 107,055
Claims priority, application Italy May 5, 1960
1 Claim. (Cl. 260—295)

Our invention relates to a new chemical product having tranquilizer activity on the central nervous system, and to the process of its preparation. The new tranquilizer compound is N,N-diphenylisonicotinamide having the following structural formula:

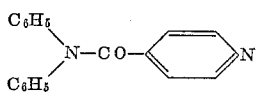

Chlorpromazine, reserpine and meprobamate have been used therapeutically as tranquilizers or psychomimetics, acting on the central nervous system. Statistics point out that injuries (alterations of the digestive system and muscular efficiency, various cutaneous manifestations) occur due to transquilizers, if high dosages are administered for a long time, and undesired side effects (alterations of the vascular system in general, fever, and alterations of the nervous system with signs of excitement, etc.) are sometimes brought about by them.

An object of this invention is to overcome these undesirable properties of tranquilizers. We have found that N,N-diphenyl-isonicotinamide in comparison to tranquilizing drugs has the surprising characteristic of having no action on the nervous vegetative system, no muscle relaxing action due to block of the spinal marrow interneurons and no hypnotic action. Moreover, N,N-diphenylisonicotinamide has a tranquilizing action higher than that of many tranquilizers in therapeutical use, and shows a low acute toxicity and does not cause toxic effects even after prolonged administration. N,N-diphenylisonicotinamide, both as free base in either solid form or suspension, and in aqueous solution as a salt with organic or inorganic acids, such as hydrochloric acid, sulfuric acid, phosphoric acid, tartaric acid, etc., is particularly useful in therapy in the treatment of neurotic anxiety and insomnia, which is frequently present therewith, and in the psychic agitations of normal patients.

The chemical structure of N,N-diphenylisonicotinamide completely differs from the structure of known tranquilizers (phenothiazine derivatives, Rauwolfia and derivatives, propanediol derivatives, diphenylmethane derivatives, ethylchrotonylurea, metathiazanones, diketodiethylmethylpiperadine, ethylphenylglutarimide, etc.), and the pharmacological properties of the chemically analogous products did not lead to foresee such an activity.

According to the invention, N,N-diphenylisonicotinamide may be prepared, in high yields, by condensing crude isonicotinyl chloride hydrochloride (preferably prepared by acylation of isonicotinic acid with thionyl chloride) with diphenylamine dissolved in an inert organic solvent, such as dioxane, in the optional presence of tertiary amines such as pyridine.

Reaction takes place in the cold, but it is preferable to operate at 80°–100° C. for about one hour. N,N-diphenylisonicotinamide hydrochloride formed by this condensation is isolated by eliminating the solvent, dissolving the solids in water and treating with an alkali, such as sodium or potassium carbonate or bicarbonate or hydroxide, preferably until the solution becomes alkaline. The N,N-diphenylisonicotinamide precipitates from the aqueous medium and is separated and purified. The preferred purification method consists of dissolving the crude free base in warm acidic water, then decolorizing with carbon, cooling and finally neutralizing with alkali.

N,N-diphenylisonicotinamide may be transformed into an aqueous solution of its salts, such as hydrochloride sulfate, phosphate, tartrate, citrate salt, by dissolving the free base in the aqueous solutions of the corresponding acids.

N,N-diphenylisonicotinamide is a white microcrystalline powder, stable both to heat and to light; it is preferably administered orally, as a pharmaceutical composition in the form of a pill, tablet, capsule, suspension or other dosage means suitable for oral administration, with a significant quantity of pharmaceutically acceptable solid or liquid carrier or diluent. Among pharmaceutically acceptable carriers or diluents are starch, lactose, talc, magnesium stearate, pectins, gelatins. The percentage of the active ingredient may vary according to the particular pharmaceutical form, but in general is from 0.5 to 80% of N,N-diphenylisonicotinamide.

Pharmaceutical compositions containing N,N-diphenylisonicotinamide in admixture with one or more therapeutically active products are also included in the present invention.

The following examples are given to illustrate, but not to limit, the present invention.

EXAMPLE 1

*N,N-Diphenylisonicotinamide*

Crude isonicotinyl chloride hydrochloride (which is obtained by acylation of 50 g. of isonicotinic acid with 180° cc. of thionyl chloride ($SOCl_2$) at reflux for about 1 hour and followed by evaporation of the excess $SOCl_2$) is dissolved in 180 cc. of dioxane and 60 cc. of anhydrous pyridine. To the solution, 60 g. of diphenylamine dissolved in 90 cc. of dioxane is added and the resulting reaction mixture is warmed on a water bath for 1 hour. The solvent is eliminated under vacuum, and the residue is pulped with a 10% aqueous solution of $Na_2CO_3$, until it becomes alkaline (about 650 cc. $Na_2CO_3$ are required). The whitish product is filtered, washed with water and dried. Yield: 90 g. of crude N,N-diphenylisonicotinamide, melting at 162–165° C. The crude product is dissolved in 4 liters of warm water to which concentrated hydrochloric acid is added to effect complete solution (about 80–85 cc. HCl are required). The solution is then boiled with decolorizing carbon, filtered while warm, cooled and neutralized with a 10% aqueous solution of $Na_2CO_3$. The white product is filtered, washed with water and dried. 80 g. of pure N,N-diphenylisonicotinamide melting at 164°–166° C. are obtained.

EXAMPLE 2

*Pharmacology of N,N-Diphenylisonicotinamide*

N,N-diphenylisonicotinamide has been administered orally, intravenously and intraperitoneally, as a suspension in a 5% gum arabic solution.

The tranquilizing dose of N,N-diphenylisonicotinamide has been determined in mice according to Beeman Test (Physiol. Zool. 20, 1947, p. 273) and in rats according to Jacobsen test (Acta Pharm. Toxicol. 11, 1955, p. 135).

The "mouse tranquilizing dose" (that is the amount of the drug expressed in mg./kg., capable of causing to disappear the attitude of violent hostility which is shown by an animal placed in the same room with another one, in 50% of couples of treated fully grown male mice) is 75 mg./kg. (intraperitoneally).

The "rat tranquilizing dose" (that is the dose of the drug expressed in mg./kg., capable of abolishing the evident signs of violent agitation and tension within the intervals between a painful stimulation and the next one, in 50% of the treated rats) is equal to 180 mg./kg. (intraperitoneally).

The tranquilizing activity of N,N-diphenylisonicotinamide is about 8 times that of mephesine and of the same order as meprobamate. In comparison with meprobamate, N,N-diphenylisonicotinamide does not show any muscle relaxant property. N,N-diphenylisonicotinamide has a good potentiating action of the barbituric narcosis. In fact, "the potentiating dose in mouse" (that is the amount of the drug, expressed, in mg./kg., which when injected 30 minutes before a dose, a little inferior to the smallest active dose, of the sodium salt of 5-ethyl-5-(1-methyl-butyl)-thiobarbituric acid is able to cause the disappearance of the righting reflexes in the 50% of the treated mice), is equal to 20 mg./kg. intraperitoneally).

The hypothermizing dose (that is the amount of the drug, expressed in mg./kg., able to produce in mice or in rats a fall of the rectal temperature of 1 degree Celsius when animals are kept at a room temperature of 22° C.) is equal to 45 mg./kg. (mouse) and to 50 mg./kg. (rat).

This hypothermizing effect lasts about 90 minutes. The ratio between the hypothermizing dose administered orally and that administered intraperitoneally is equal to 8.

The lethal dose, that is the amount of drug expressed in mg./kg., which when administered intraperitoneally is able to kill 50% of the treated animals in 48 hours, is equal to 600 mg./kg. in mouse and more than 1000 mg./kg. in rat.

Doses of 400 mg./kg. in mouse and 900 mg./kg. in rat do not cause the disappearance of the righting reflexes. N,N-diphenylisonicotinamide administered orally in dogs, at a dose of 100 mg./kg. daily for 30 days, does not cause changes either in the hematic crasis or in the hepatic and renal functions.

N,N-diphenylisonicotinamide, administered both intravenously and intraperitoneally at a dose of 100 mg./kg. in dogs under narcosis by 5,5-diallylbarbituric acid, does not modify either the arterial blood pressure or the rhythm and breathing amplitude, or the vascular response to adrenaline, acetylcholine or histamine.

We claim:

N,N-diphenylisonicotinamide having the following formula:

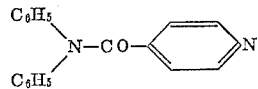

References Cited in the file of this patent

UNITED STATES PATENTS

| | | |
|---|---|---|
| 2,310,873 | Sauer | Feb. 9, 1943 |
| 2,369,776 | Cusa et al. | Feb. 20, 1945 |
| 2,407,412 | Frost | Sept. 10, 1946 |
| 2,477,491 | Miller | July 26, 1949 |
| 2,721,203 | Meyer | Oct. 18, 1955 |
| 2,750,391 | Wilbert | June 12, 1956 |
| 2,784,141 | Jacobsen | Mar. 5, 1957 |
| 2,854,379 | Fancher | Sept. 30, 1958 |
| 2,965,646 | Gardner et al. | Dec. 20, 1960 |

OTHER REFERENCES

Noller: "Chemistry of Organic Compounds," 2nd Ed., pp. 244, 479 (1957) (Saunders).

Chemical Abstracts, vol. 50, p. 7110b (1956), abstracting Dimitrijevic et al., in "Glasnik Kemiskoy Drushtva," vol. 20, pp. 187–97 (1955).

Beilstein: "Handbuch der Organischen Chemie," 4th Ed., Band XXII, H.W., p. 46.